United States Patent [19]
Dobrzynski

[11] Patent Number: 5,159,899
[45] Date of Patent: Nov. 3, 1992

[54] OBTAINING ENERGY FROM WASTE PRODUCTS BY THE PYROLYSIC PROCESS USING EXHAUST GAS FROM AN INTERNAL COMBUSTION ENGINE OR TURBINE

[76] Inventor: Zbigniew Dobrzynski, P.O. Box 706, East Quogue, N.Y. 11942

[21] Appl. No.: 539,926

[22] Filed: Jun. 18, 1990

[51] Int. Cl.$^5$ ............................................. F02B 43/08
[52] U.S. Cl. .................................. 123/3; 48/DIG. 8; 110/229
[58] Field of Search ................ 422/174; 110/229, 346, 110/349; 48/DIG. 8; 123/3

[56] References Cited

U.S. PATENT DOCUMENTS

| | | | |
|---|---|---|---|
| 2,363,708 | 11/1944 | Urpuhart | 48/DIG. 8 |
| 2,846,297 | 8/1958 | Herwig | 48/DIG. 8 |
| 4,372,256 | 2/1983 | Firey | 48/DIG. 8 |

Primary Examiner—Edward G. Favors
Attorney, Agent, or Firm—Michael I. Kroll

[57] ABSTRACT

Apparatus for obtaining energy from waste products is disclosed. The apparatus includes an upper tank for receiving waste products, a heating system for heating the upper tank by fluid from the cooling system of the combustion engine, and a reactor for excepting the heated waste for further processing.

7 Claims, 2 Drawing Sheets

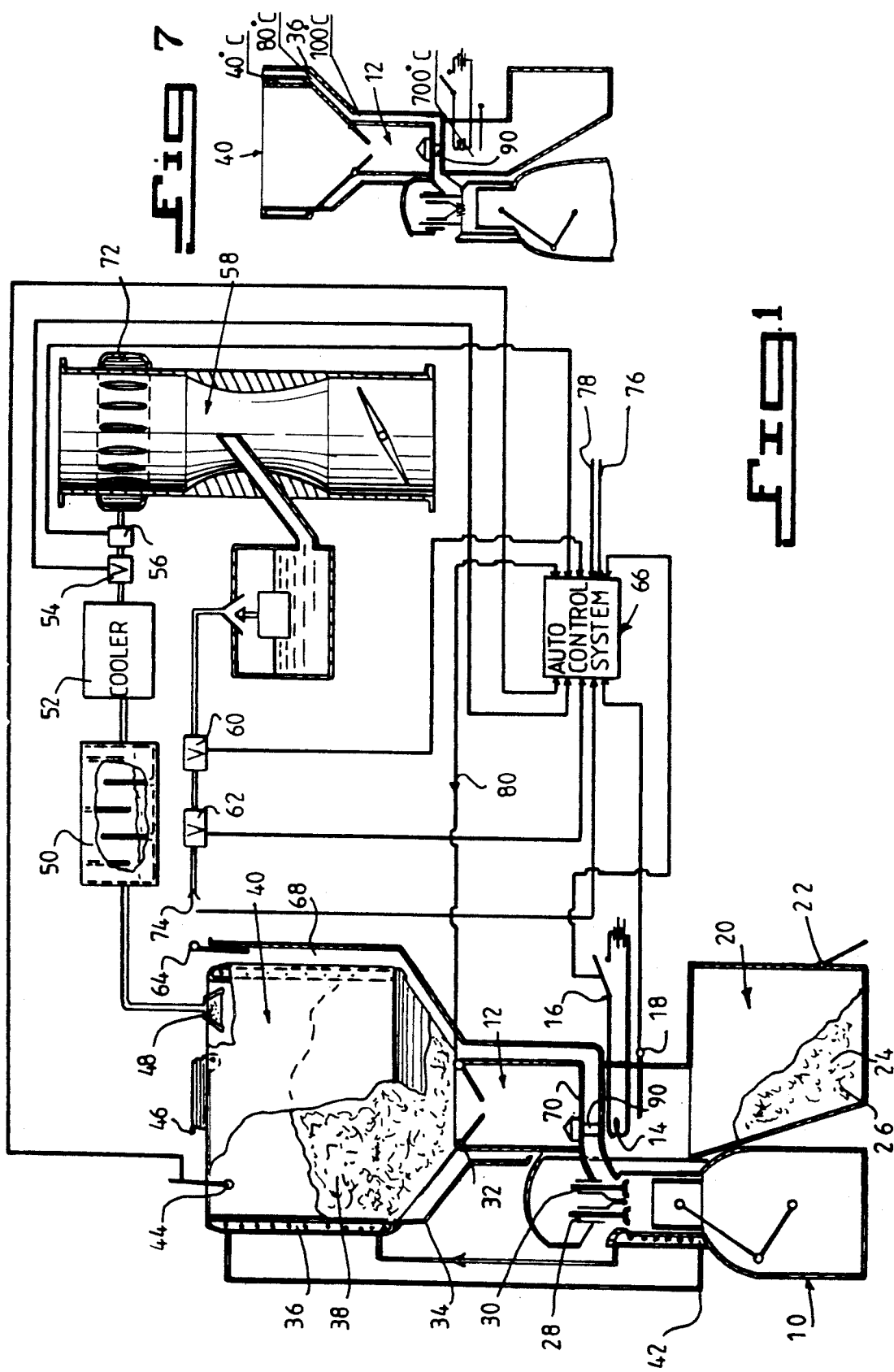

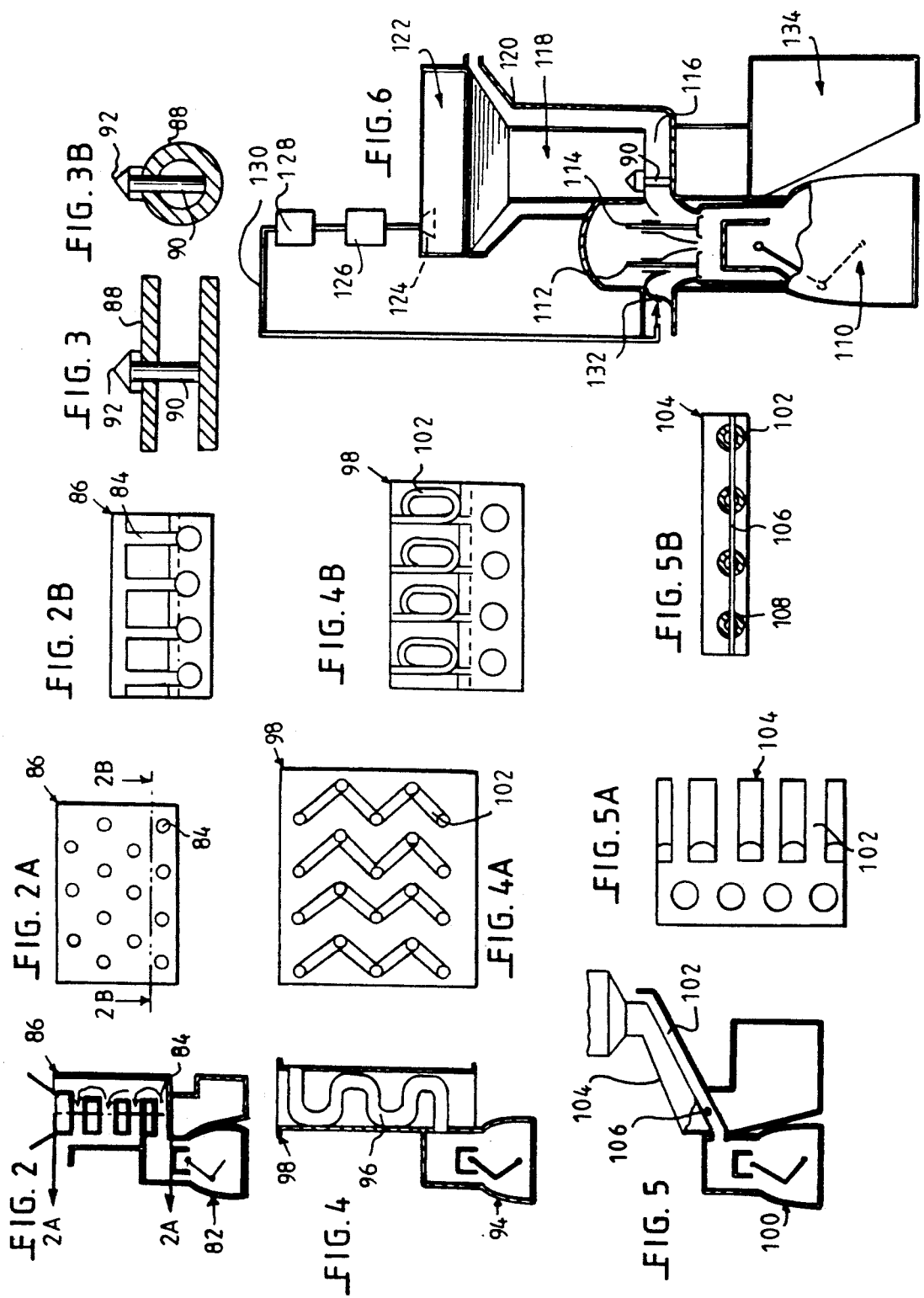

OBTAINING ENERGY FROM WASTE PRODUCTS BY THE PYROLYSIC PROCESS USING EXHAUST GAS FROM AN INTERNAL COMBUSTION ENGINE OR TURBINE

BACKGROUND OF THE INVENTION

1. Field of the Invention

The present invention relates to chemical recycling. More particularly, the present invention relates to means for obtaining energy from waste products by the pyrolysic process using exhaust gas from an internal combustion engine or turbine.

2. Description of the Prior Art

Numerous innovations for chemical recycling have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide an apparatus for obtaining energy from waste products avoids the disadvantages of the prior art.

More particularly, it is an object of the present invention to provide an apparatus for obtaining energy from waste products that utilizes waste and heat from exhaust gases to obtain mechanical energy and chemical by-products, such as benzene and naphathaline, in addition to the metal collected. The exhaust gas produced by the use of the present invention is safe and will not poison the environment in which it functions.

In keeping with these objects, and with others which will become apparent hereinafter, one feature of the present invention resides, briefly stated, in an apparatus using fluid from a cooling system of an internal combustion engine for obtaining energy from waste products, and comprising an upper tank for receiving the waste products, a heating system for heating the upper tank by using the fluid from the cooling system of the internal combustion engine, so that the waste products are heated and wherein a reactor is provided for excepting the heated waste products.

When the apparatus is designed in accordance with the present invention, energy is obtained from the waste products.

In accordance with another feature of the present invention, it further comprises a control valve for regulating the amount of waste entering the reactor.

Another feature of the present invention is that the reactor functions as a pipe heat exchanger.

Yet another feature of the present invention is that it further comprises an electric resistance heater that provides the extra heat necessary to start a exothermic chemical reaction.

Still another feature of the present invention is that it further comprises a lower tank where the liquid and solid hydrocarbons are disposed.

Yet still another feature of the present invention is that the reactor is directly connected to the internal combustion engine without the need for connecting pipes so that no energy is wasted between the internal combustion engine and the reactor.

Still yet another feature of the present invention is that it further comprises a bolt, an exhaust pipe having a beginning, a high velocity exhaust gas, and a high temperature point so that the high temperature point is achieved by installing the bolt through the exhaust pipe at its beginning and having the high velocity exhaust ga hit the bolt and give the bolt energy that yields the high temperature point.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a schematic drawing showing the principle of operation of the carburetor engine used in the present invention;

FIGS. 2, 2A, and 2B show the reactor type pipe heat exchanger of the present invention;

FIGS. 3 and 3B show the high temperature point of the present invention;

FIGS. 4, 4A, and 4B show the reactor type spiral pipe heat exchanger of the present invention;

FIGS. 5, 5A, and 5B show the reactor type plate-pipe heat exchanger of the present invention;

FIG. 6 is a schematic drawing showing the principle of operation of the diesel engine of the present invention; and FIG. 7 shows the distribution of temperature in the reactor and the upper tank.

LIST OF REFERENCE NUMERALS UTILIZED IN THE DRAWING

10 - engine
12 - reactor
14 - electro-resistance heater
16 - automatic electro-resistance heater switch of the electro-resistance heater switch 14
18 - sensor for the reactor temperature gauge
20 - lower tank
22 - draining valve of the lower tank 20
24 - fluid hydrocarbons in the lower tank 20
26 - solid hydrocarbons in the lower tank 20
28 - suction valve
30 - exhaust valve
32 - control valve
34 - heating jacket for the exhaust gas
36 - heating jacket for the fluid from the cooling system
38 - waste in the upper tank 40
40 - upper tank
42 - fluid from the cooling system
44 - safety valve
46 - filler/flap valve
48 - first gas hydrocarbon filter
50 - second gas hydrocarbon filter
52 - cooler
54 - gas hydrocarbon valve
56 - flow-meter for the gas hydrocarbons
58 - carburetor
60 - flow-meter for fluid fuel
62 - fluid fuel valve
64 - gauge for the exhaust gas analyzer meter
66 - automatic control system
68 - exhaust gas
70 - heating pipe in the reactor 40

72 - gas hydrocarbons
74 - fluid fuel
76 - to the servomechanism that adjusts the RPMs
78 - to angle of advance
80 - to the servomechanism of the control valve
82 - engine shown in FIG. 2
84 - pipes shown in FIGS. 2, 2A, and 2B
86 - reactor shown in FIGS. 2, 2A, and 2B
88 - exhaust gas pipe shown in FIGS. 3 and 3B
90 - bolt
92 - high temperature point shown in FIGS. 3 and 3B
94 - engine shown in FIG. 4
96 - pipes shown in FIG. 4
98 - reactor shown in FIGS. 4, 4A and 4B
100 - engine shown in FIG. 5
102 - pipes shown in FIGS. 4A, 4B, 5, 5A, and 5B
104 - reactor shown in FIGS. 5, 5A, and 5B
106 - steel rod shown in FIG. 5B
108 - high temperature point shown in FIG. 5B
110 - engine shown in FIG. 6
112 - suction valve
114 - exhaust valve
116 - exhaust gas pipe
118 - reactor shown in FIG. 6
120 - heating jacket of the exhaust gas
122 - upper tank shown in FIG. 6
124 - first gas hydrocarbon filter shown in FIG. 6
126 - second gas hydrocarbons filter shown in FIG. 6
128 - cooler shown in FIG. 6
130 - gas hydrocarbons shown in FIG. 6
132 - throttle shown in FIG. 6
134 - lower tank shown in FIG. 6

DETAILED DESCRIPTION OF THE PREFERRED EMBODIMENT

The automatic control system 66 of the present invention regulates the purity of the exhaust gas 68, the temperature of the reaction, and the amount of obtainable gas hydrocarbons 130.

The degree of purity of the exhaust gas 68 is controlled by the amount of liquid fuel 74, and the quality of the hydrocarbon gas fuel 72.

The air-fuel mixture of the carburetor 58 is correct. If the engine 10, 82, 94, 100, or 110 has too rich a mixture the automatic control system (ACS) 66 will lower first the liquid fuel intake and next it will lower the amount of gas hydrocarbons 130.

If the engine 10, 82, 94, 100, or 110 has too lean a mixture, the ACS will increase first the amount of gas hydrocarbons 130 and next the amount of the liquid fuel.

The temperature of the reaction is controlled by changing the amount of wastes in the reactor 12, 86, 98, 104, or 118 changing the revolution per minute of the engine 10, turning the electrical resistance heater 14 on or off, and change the angle of advance 78 of the distributor of the ignition system.

The correct temperature of the reaction should be 700° C. If the temperature is too low, the ACS will lower the amount of the waste in the reactor 12, 86, 98, 104 or 118 increase the revolutions per minute of the engine 10, 10, 82, 94, 100, or 110 turn on the electrical resistance heater 14, and lower the angle of advance 78 of the distributor of the ignition system.

If the temperature is too high, the ACS turns off the electrical resistance heater 14, increases the amount of waste in the reactor 12, 86, 98, 104 or 118 and lowers the revolutions per minute of the engine 10, 82, 94, 100, or 110. The angle of distributor advance is not changed.

The ratio of hydrocarbons to air are kept correct. If there is too little gas hydrocarbons 130, the ACS 66 will increase the temperature of the reaction. If there is too much gas hydrocarbons 130, the ACS 66 will decrease the temperature of the reaction.

The automatic control system 66 of the present invention, as shown in the FIGS. 1 through 7, include a sensor 18 for the reactor temperature gauge, a gauge 64 for the exhaust gas analyzer meter, a flow-meter 56 for the gas hydrocarbons, a flow meter 60 for the fluid fuel, and a sensor for the safety valve 44.

Additionally, a control valve 32, gas hydrocarbons valve 54, fluid fuel valve 62, automatic electro resistance heater switch 16, angle of advance regulator, and a servomechanism to adjust the RPMs.

EXAMPLE OF THE DISPOSITION OF TEMPERATURE IN THE REACTOR 12 AND THE UPPER TANK 40, AS SHOWN IN FIG. 7

700° C. at the high temperature point,
100° C. at the top of the reactor 12,
800° C. at the bottom of the heating jacket 36 with fluid, and
40° C. at the top of the heating jacket 36 with fluid.

EXAMPLE OF THE ENERGY DISTRIBUTION OF THE CHEMICAL REACTION OF THE PRESENT INVENTION $Q_1$ - heat gained by the exhaust gas,
$Q_2$ - heat gained by the chemical reaction,
$Q_3$ - heat gained by the fluid from the cooling system of the engine,
$Q_4$ - heat lost by the exhaust gas,
$Q_5$ - heat lost by the fluid from the cooling system of the engine,
$Q_6$ - heat lost by the hydrocarbons, and
$Q_7$ - lost waste heat.
where $Q_1 + Q_2 + Q_3 = Q_4 + Q_5 + Q_6 + Q_7$

EXAMPLE OF THE MASS BALANCE OF THE CHEMICAL REACTION OF THE PRESENT INVENTION $m_1$ - garbage mass,
$m_2$ - gas hydrocarbons mass,
$m_3$ - fluid hydrocarbons mass,
$m_4$ - solid hydrocarbons mass, and
$m_5$ - ash mass.
where: $m_1 = m_2 + m_3 + m_4 + m_5$ The present invention depends upon obtaining from the waste, hydrocarbons of gas, fluid, and solid by the use of the pyrolysis process. The waste used must contain carbon and hydrogen, together with plastic, rubber, wood, straw, leaves, or cloth.

The waste is cut into small pieces and is then placed into the upper tank 40. The upper tank 40 is heated by the fluid from the cooling system 42 of the internal combustion engine 10. The waste drops down into the reactor 12 through the control valve 32 with the reactor 12 being a pipe heat exchanger. In the that comes from the internal combustion engine 10 or turbine, and the waste, is counter current. The exhaust 68 comes from an internal combustion engine 10 or turbine.

The temperature during the pyrolysis process, is dependent upon the chemical constitution of the waste.

The pyrolysis process functions better at a high temperature point, that is in the range of 300° to 700°.

The additional electric resistance heater 14 provides extra heat necessary to start the exothermic chemical reaction. The heated gas hydrocarbons from the pyrolysis process return to the upper tank 40 where they are filtered and cooled. The gas comes from the internal combustion engine 10, 82, 94, 100, or 110 and is utilized as the fuel for the internal combustion engine 10, 82, 94, 100, or 110 or turbine. The process is a closed cycle and the liquid 24 and the solid hydrocarbons 26 are disposed in the lower tank 20.

The manner in which the reactor 12, 86, 98, 104 or 118 is connected to the engine 10, 82, 94, 100, or 110 is as follows. If one were to take the engine , 82, 94, 100, or 110, in which the intake manifold (not shown) and the exhaust manifold (not shown) are on opposite sides of the engine 10, 82, 94, 100, or 110, one may take the exhaust manifold (not shown) out and connect the reactor 12 directly to the engine 10, 82, 94, 100, or 110 without the need for connecting pipers, as shown in FIG. 1, FIG. 2, FIG. 4, FIG. 5, and FIG. 6. This direct connection does not waste any energy between the engine 10, 82, 94, 100, or 110 and the reactor 12, 86, 98, 104 or 118.

As shown in FIG. 1, FIG. 3, FIG. 3B, FIG. 5B, FIG. 6 and FIG. 7, the high temperature point 92 is achieved by installing a bar or bolt 90 through the exhaust gas pipe adjacent the reactor so that the exhaust gas, with its high velocity hits the bar or bolt 90 and gives the bar or bolt 90 energy that yields the high temperature point 92.

It will be understood that each of the elements described above, or two or more together, may also find a useful application in other types of constructions differing from the type described above.

While the invention has been illustrated and described as embodied in means for obtaining energy from waste products by the pyrolysic process using exhaust gas from an internal combustion engine or turbine, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. Apparatus using fluid from a cooling system of an internal combustion engine for obtaining energy from waste products, comprising:
    a) an upper tank for receiving the waste products;
    b) means forming a heating system for heating said upper tank by using the fluid from the cooling system of the internal combustion engine so that the waste products are heated; and
    c) means forming a reactor for accepting the heated waste products for processing so that the energy is obtained from the waste products.

2. Apparatus as defined in claim 1; further comprising a control valve for regulating the amount of waste entering said reactor.

3. Apparatus as defined in claim 2, wherein said reactor functions as a pipe heat exchanger.

4. Apparatus as defined in claim 3; further comprising an electric resistance heater that provides the extra heat necessary to start a exothermic chemical reaction.

5. Apparatus as defined in claim 4; further comprising a lower tank in communication with said reactor where liquid and solid hydrocarbons are disposed.

6. Apparatus as defined in claim 5, wherein said reactor is directly connected to the internal combustion engine without the need for connecting pipes so that no energy is wasted between the internal combustion engine and said reactor.

7. An apparatus as defined in claim 6 further comprising means forming an exhaust pipe connected to and extending from said reactor, a bolt installed in said exhaust pipe closely adjacent said reactor such that high velocity exhaust gas contacting said bolt creates a high temperature point at an end of said bolt.

* * * * *